United States Patent
Gold et al.

(10) Patent No.: US 7,912,898 B2
(45) Date of Patent: Mar. 22, 2011

(54) SYSTEM AND METHOD FOR MEASURING REACTIONS TO PRODUCT PACKAGING, ADVERTISING, OR PRODUCT FEATURES OVER A COMPUTER-BASED NETWORK

(75) Inventors: Peter Gold, Armonk, NY (US); Randall K. Thomas, Penfield, NY (US); Joseph M. DiGregorio, Rochester, NY (US)

(73) Assignee: Harris Interactive, Inc., Rochester, NY (US)

( * ) Notice: Subject to any disclaimer, the term of this patent is extended or adjusted under 35 U.S.C. 154(b) by 824 days.

(21) Appl. No.: 11/974,582

(22) Filed: Oct. 15, 2007

(65) Prior Publication Data
US 2008/0040205 A1 Feb. 14, 2008

Related U.S. Application Data

(63) Continuation of application No. 10/783,733, filed on Feb. 20, 2004, now Pat. No. 7,302,475.

(51) Int. Cl.
*G06F 15/16* (2006.01)
(52) U.S. Cl. .................................. 709/203; 709/217
(58) Field of Classification Search .................. 709/203, 709/217
See application file for complete search history.

(56) References Cited

U.S. PATENT DOCUMENTS
6,011,537 A 1/2000 Slotznick
6,032,130 A 2/2000 Alloul et al.
6,154,771 A 11/2000 Rangan et al.
(Continued)

FOREIGN PATENT DOCUMENTS
WO WO 01/09703 2/2001
(Continued)

OTHER PUBLICATIONS irt.org, Web Page Printout, http://developer.irt.org/script/282.htm, 2001.
(Continued)

*Primary Examiner* — Kristie D Shingles
(74) *Attorney, Agent, or Firm* — Kenneth J. LuKacher

(57) ABSTRACT

A system and method is provided for enabling respondents at their computer systems to connect via a browser with a server computer over a network, such as the Internet, and receive an initial set of survey questions on one or more pages during which primary images are downloaded into the browser's cache but are not presented to each respondent as they are each displayed into a small (e.g. 1 by 1) pixel area on display of the respondent's computer system and thus are not detectable by respondents. After receiving answers to such questions for each of the respondents, the server computer directs the browser of each respondent computer with at least one survey question in which the primary image is displayed from the browser's cache for a brief interval of time to the respondent, and the respondent answers the question with respect to the primary image. Different survey questions may be presented to the respondent having different timed displayed primary images. The results of the survey questions and the answers after each timed displayed primary image are registered at the server computer. The primary images may be images of store shelves of different product packages, advertisements, or product having different features, in which the questions relate to recall or findability of a target element, such as a product package, a feature of an advertisement, or a product feature, respectively, in the primary image.

28 Claims, 10 Drawing Sheets

U.S. PATENT DOCUMENTS

| | | | |
|---|---|---|---|
| 6,157,933 | A | 12/2000 | Celi, Jr. et al. |
| 6,304,852 | B1 | 10/2001 | Loncteaux |
| 6,311,190 | B1 | 10/2001 | Bayer et al. |
| 6,442,573 | B1 | 8/2002 | Schiller et al. |
| 6,453,073 | B2 | 9/2002 | Johnson |
| 6,477,504 | B1 * | 11/2002 | Hamlin et al. .......... 705/10 |
| 6,510,462 | B2 | 1/2003 | Blumenau |
| 6,567,983 | B1 | 5/2003 | Shiimori |
| 6,670,934 | B1 | 12/2003 | Muoio et al. |
| 6,904,408 | B1 * | 6/2005 | McCarthy et al. .......... 705/2 |
| 2002/0184364 | A1 | 12/2002 | Brebner |

FOREIGN PATENT DOCUMENTS

| | | |
|---|---|---|
| WO | WO 02/103474 | 12/2002 |

OTHER PUBLICATIONS

"HTML and Browsers—is it possible to load imgs before others?" WEBMASTERWORLD.COM FORUMS [Online] Dec. 15 2002, pp. 1-7, from www.webmasterworld.com/forum21/3884.htm.

Leis J.: "Rapid display of web content: a 1-10 simple method for prefetching web files", Computing & Control Engineering Journal, vol. 13, No. 3, Jun. 2002, pp. 149-152.

* cited by examiner

Preload images

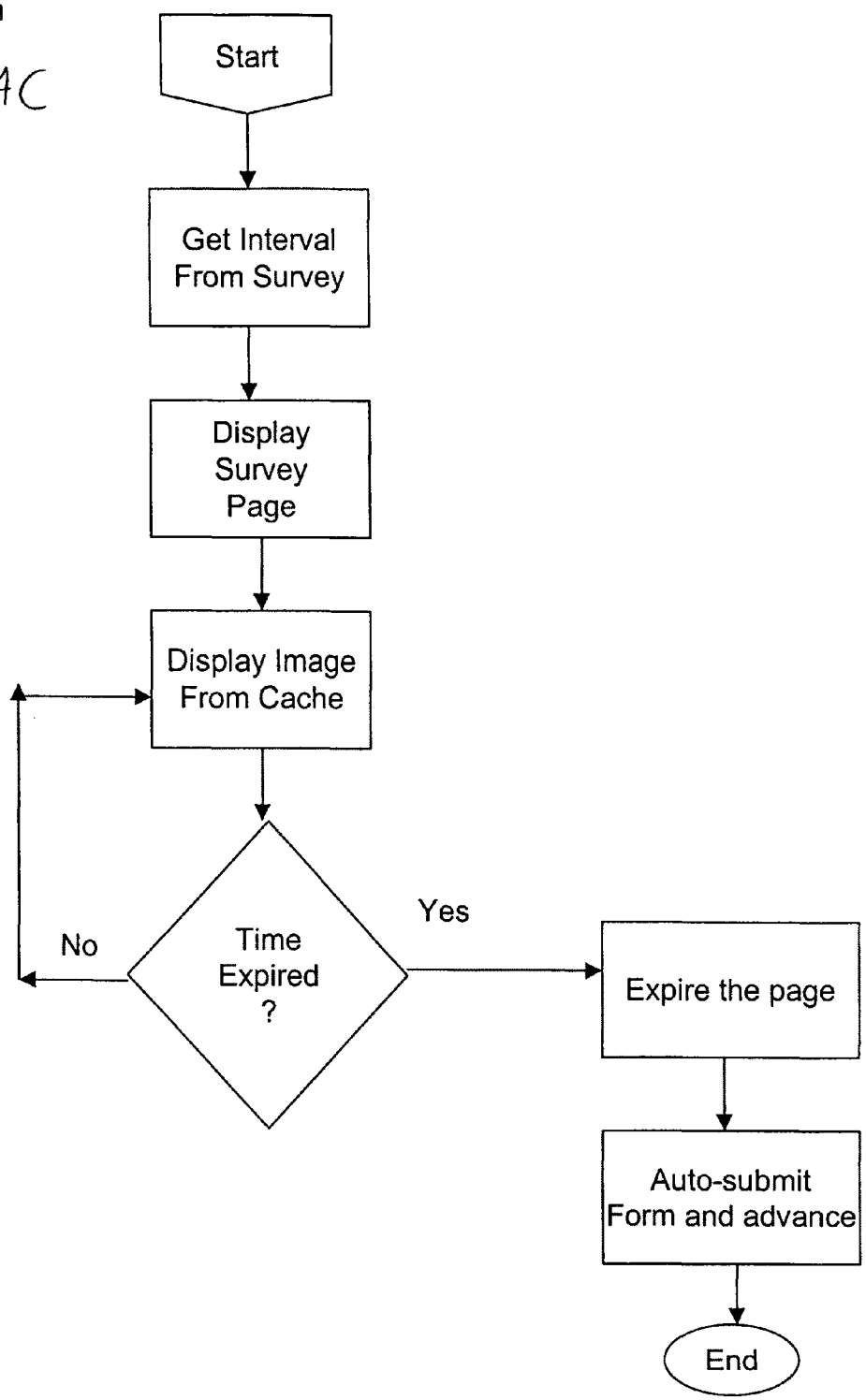
FIG. 4C Timed Display Function

Next, please assume that you are in the store shopping for products.

On the next screen, you will be shown an image of products that you might see on some store shelves. The image will flash on your screen, and then the page will change automatically.

Please click the NEXT button below to go to the next screen and view the image. Please be patient because it may take a moment or two for the image to appear on that screen.

FIG. 5

SYSTEM AND METHOD FOR MEASURING REACTIONS TO PRODUCT PACKAGING, ADVERTISING, OR PRODUCT FEATURES OVER A COMPUTER-BASED NETWORK

This application is a Continuation of U.S. patent application Ser. No. 10/783,733, filed Feb. 20, 2004 now U.S. Pat. No. 7,302,475.

FIELD OF THE INVENTION

The present invention relates to a system and method for measuring reactions to product packaging, advertising, or product features over a computer-based network, and particular to, a system and method for measuring reactions to packaging, advertising, or product features over a computer-based network by a plurality of respondents at their computers in which images are preloaded into a browser's cache without such images being detectable by the respondents, whereby a preloaded image can be displayed to each respondent for a pre-defined brief time interval and the respondent can answer questions regarding the displayed image, such as number of elements recalled from the image or findability of a target element in the image. The timed displayed image may be of store shelves of different product packages, advertisements, or products, and the target element may represent a target product package, feature of an advertisement (e.g., logos, words, graphics, or color), or feature of a product, respectively. The invention is useful for preloading high resolution images to be timed displayed in order to avoid any delay in image download over the network which would vary the duration of the timed display at different respondents' computer systems, such as due to network communication delay and differences in bandwidth connection to the network, and thus hinder the ability to compare measured reactions of different respondents.

BACKGROUND OF THE INVENTION

The marketing industry often evaluates the effectiveness of product packages, advertisements, or product features to provide information for making marketing and product development decisions. There have been four primary approaches to judge the effectiveness of a package, advertisement, or product feature: focus groups, eye-tracking, tachistiscope, and surveys. The focus group approach uses small groups of respondents recruited to a central location, such as a shopping mall, for the purpose of eliciting ideas and opinions concerning new and/or old package designs or advertising graphics. Since focus groups require a central location, group dynamics are not realistic of actual purchase settings, impact or findability cannot be measured, and there is large potential for interviewer bias. The eye tracking approach employs techniques to measure eye movements to assess what a respondent actually looks at within a competitive shelf context or within an advertisement. Although more scientific and quantitative than focus groups, it also requires central location testing, has moderator/interviewer bias, and requires specialized equipment that can make respondents feel like test subjects. The tachistiscopic approach requires use in central locations, such as a laboratory or shopping mall, of a tachistiscope, a large specialized device which presents visual images of packages, shelf sets, or advertisements for very brief periods. The results are normally used to measure package impact within a competitive shelf context (the frequency a particular package is noticed within the set of packages) or the attention-getting features of an advertisement (what elements the respondent saw). Tachistiscopes are expensive, and although scientific and quantitative, it requires a central location, and can have interviewer bias. Further, since these three approaches require central location testing, the sampling of respondents may not be geographically representative.

The survey approach employs a series of questions and varying response formats presented directly to respondents, and can be administered in a variety of modes (in person or on-line) and will often present the image of packages or advertisement for as long as respondents want to look at them. The respondents are then asked questions about the packages or advertisement. Although fast and inexpensive, current question and answer surveys lack measures of impact and findability of packages and/or features, and cannot be used to evaluate packages in shelf contexts. Thus, it would be desirable to evaluate reactions to product packaging, advertising, or product features to large number of respondents in a survey format which does not require a central testing location, avoids interview bias, and can measure impact and findability of such product package, advertisement, or product features.

SUMMARY OF THE INVENTION

It is the principal object of the present invention to provide a system and method for measuring reactions by respondents to product packaging, advertising, or product features over a computer-based network.

It is another object of the present invention to provide a system and method for measuring reactions to packaging, advertising, or product features over a computer-based network which enables images to be preloaded by typical browser software operating on a respondent computer system where preloaded images are stored but are undetectable by the respondent.

It is still another object of the present invention to provide a system and method for measuring reactions to packaging, advertising, or product configuration over a computer-based network in a survey at a respondent computer systems in which images are preloaded by the browser of the respondents computer system during the survey for use later in the survey where timed display of such images is required, such that the timed display of such images occur independent of network communication.

Briefly described, the system embodying the present invention includes at least one server computer system connected to a network, such as the Internet, and at least one client computer system of a respondent (referred to as respondent computer system) having browser software capable of connecting the respondent computer system to the server computer system for data communication through the network. The respondent computer system receives an initial set of survey questions from the server computer system on one or more pages during which primary images are downloaded into the browser's cache but are not presented to each respondent as they are each displayed into a small (e.g., 1 by 1) pixel area on display of the respondent's computer system to avoid detection of the image by the respondent. After receiving answers to such questions for the respondents, the server computer system directs the browser of the respondent computer to display with at least one survey question one of the primary images from the browser's cache for a brief interval of time to the respondent, and then to display a question with respect to the primary image just viewed. The result of this survey question is sent to the server computer system from the respondent computer system and are registered at the server computer system.

Once the primary images are stored at the respondent computer system, different types of survey questions may be presented to the respondent having different or the same timed displayed primary image. Preferably, there are two question types. One type measures the number of elements the respondent recalls in the image to test impact of a target element in the primary image by displaying a response set with different elements, and the second type measures the findability of a target element in the primary image, such as on a grid.

Different groups of respondents may be presented with primary images so as to determine which target elements are most effective in obtaining the attention of consumers. The primary images may be images of store shelves of different product packages, advertisements, or products, and the target element may represent a product package, a feature of an advertisement, or a product feature, respectively.

A feature of the system and method of the present invention is that it may be utilized by typical browser software used on computer system or devices, such that respondents do not require additional equipment or need specialized software to conduct reaction testing of respondents. Also, as on-line surveys are being conducted, the respondents are not located at a central location and interview bias is avoided.

The present invention also embodies a method for measuring reactions to evaluate the effectiveness of a target element in one or more primary images of a plurality of elements including the target element by a respondent over a network, including the steps of: connecting a client computer system of a respondent over a network to at least one server computer system; sending from the server computer system to a client computer system one or more survey questions; displaying the survey questions on a display coupled to the client computer system for answer by the respondent; answering the questions at the client computer system over one or more screens on the display; returning from the client computer system to the server computer system answers to the survey questions from each screen; downloading primary images to the client computer system from the server computer system into memory of the client computer system while the survey questions are being displayed and answered by the respondent, in which when downloaded, primary images are displayed onto the pages with the displayed survey questions at predefined pixel areas which avoids user detection of the downloaded images; sending from the server computer system to the respondent computer system instructions directing the client computer system to display survey instructions and one of the primary images for a specified period of time, and a response set; displaying at the respondent computer system the survey instructions and the one of the primary images stored in memory of the client computer system for the specified period, and then the response set; and returning from the client computer system to the server computer system answers to the response set.

BRIEF DESCRIPTION OF THE DRAWINGS

The foregoing objects, features and advantages of the invention will become more apparent from a reading of the following description in connection with the accompanying drawings in which:

FIG. 4C is a flow chart showing the process of the timed display of one of the preloaded images from the browser's cache of FIGS. 2 and 4;

FIG. 5 is a display screen in a browser window on the client computer system of FIG. 1 showing an example of the instructions for the element recall testing of FIGS. 2 and 3.;

FIG. 6 is an example of one of the primary images for product package evaluation on shelves which may be timed displayed in FIGS. 2 and 4;

FIG. 9 is an example a display screen in a browser window on the client computer system of FIG. 1 showing a response grid as may be used in the target element findability of FIG. 4.

DETAILED DESCRIPTION OF THE INVENTION

Figure 1:
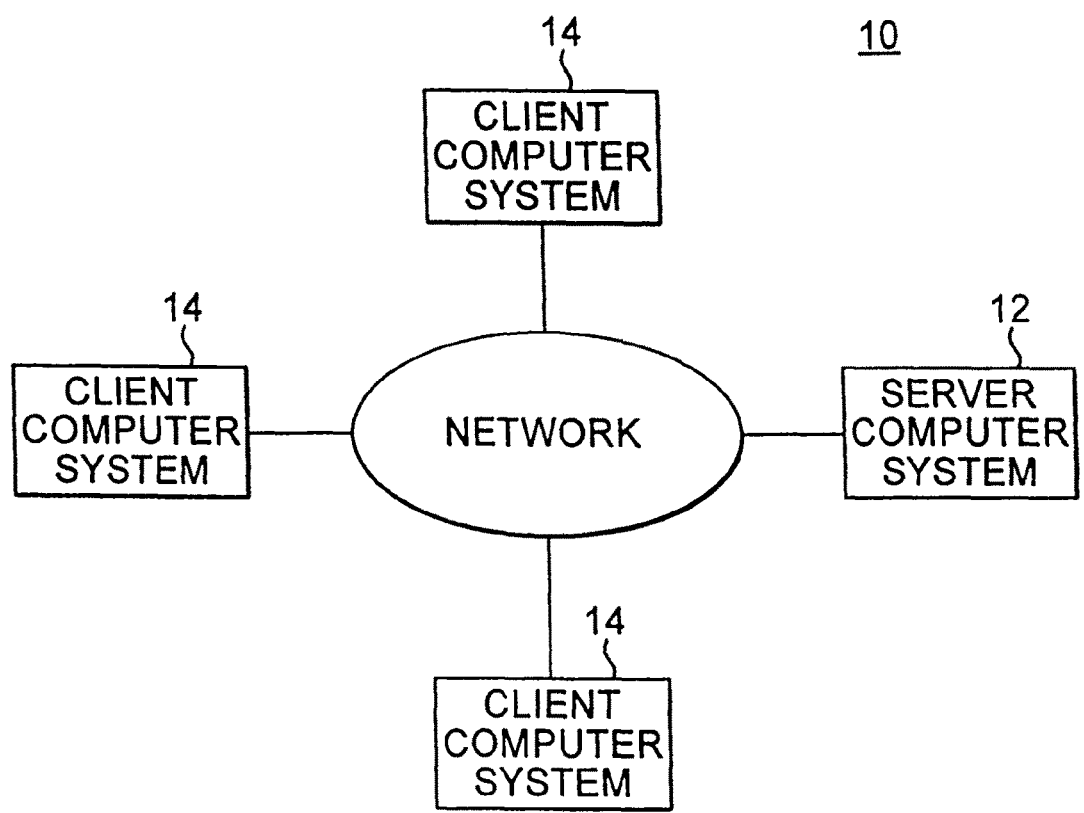
FIG. 1 is a block diagram of the system in accordance with the present invention showing a computer server coupled to one or more client computer systems via a computer-based network in which the computer server can be connected with browser software on each of the client computer systems.

Referring to FIG. 1, is a block diagram of the system 10 having a network server computer system 12 coupled to client computer systems 14 via a computer based network 13, such as the Internet (including the World Wide Web), or other public network. The server computer 12 may be coupled to one or more of such client computer systems 14, as typical of communication over the Internet. Client computer system 14 may represent a desktop, laptop, pda, WebTV, or other computer system having typical web browser software, such as Microsoft Explorer or Netscape Navigator, and network interface, such as a telephone or cable modem, wireless network interface, or T1/T2 data line to an Internet Service Provider, for communicating to web sites at Internet addresses associated with such sites. The client computer systems 14 may each have a display, and a user interface, such as a keyboard and mouse, or other device typically used to enable a graphical user interface on a computer system, such as trackball or touchpad. The server computer 12 provides a web site on network 13 associated with one or more Internet Addresses (or URLs) which is used by the browser software operating on each client computer system 14 to access the web site. One or a number of client computer systems 14 may connect to the server computer 12 over network 13. The web site provided by the server computer 12 may represent multiple servers which may be on a single or multiple computer systems. In the preferred embodiment, a survey server 16 and a graphics server 17 is supported on the server computer system 12.

Figure 2:
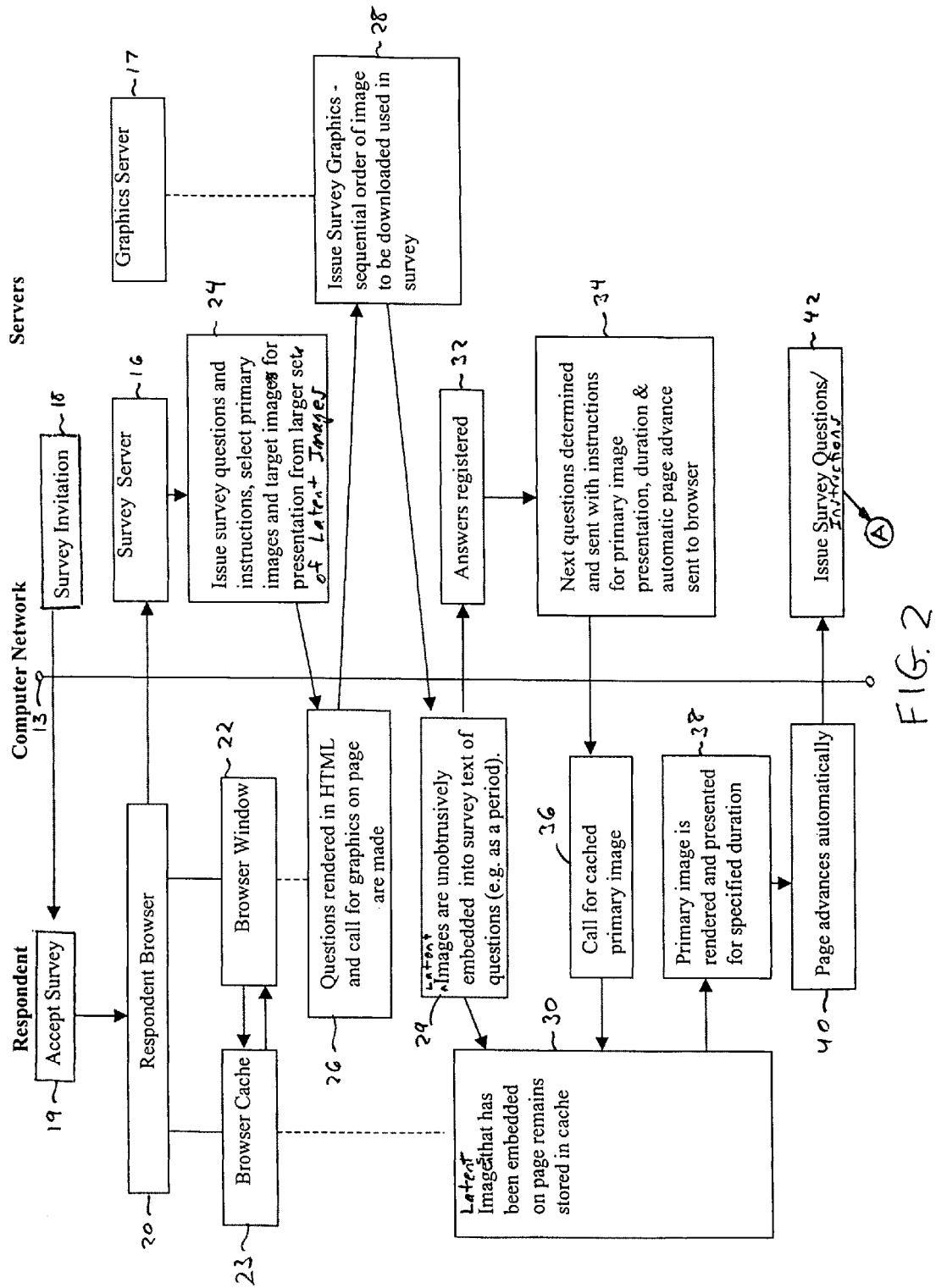
FIGS. 2-3 is a connected flow diagram of the operation of the system of FIG. 1 over a network in which the right side represents the processing of the one or more computer servers and the left side represents the processing at one of the client computer system, showing the preloading of primary images over one or more HTML pages to browser software operating on a client computer system, and one of the preloaded primary images being timed displayed for element recall testing.
Figure 3:
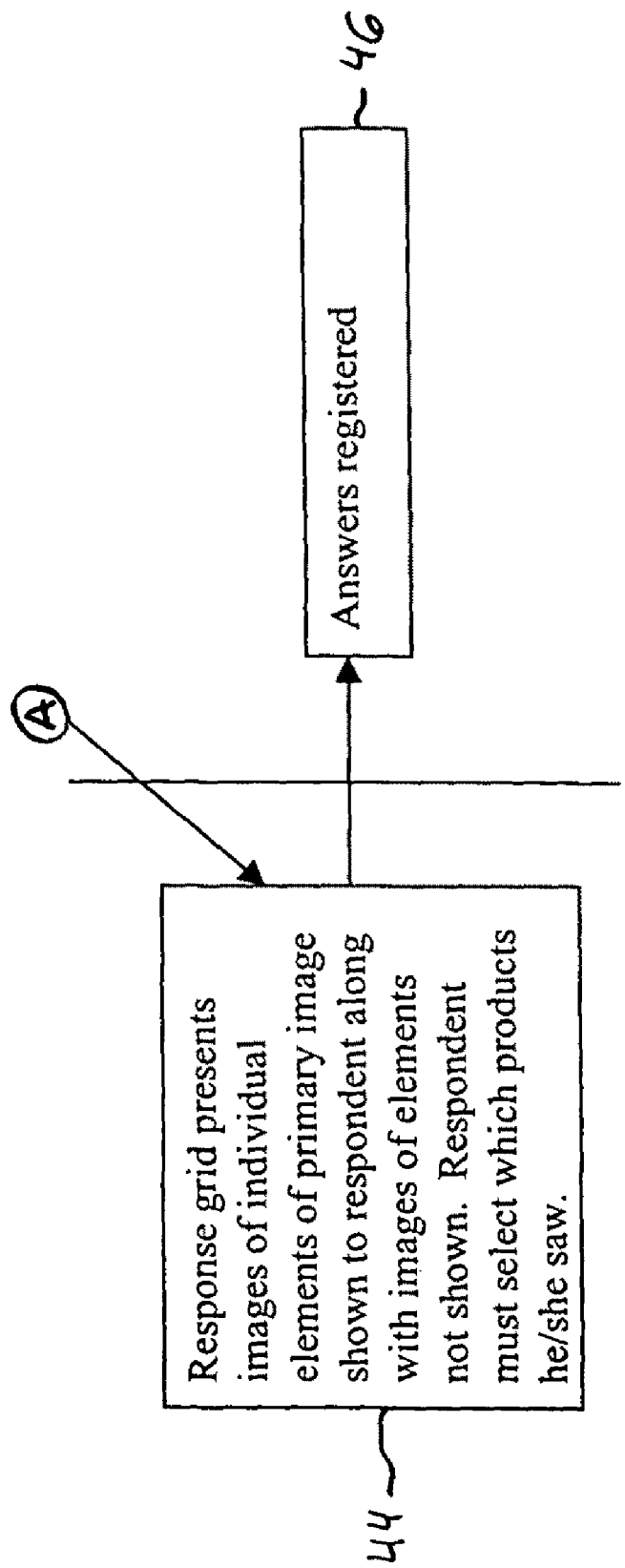

The operation of the system 10 is shown in FIG. 2. At step 18, a user or person at each client computer system 14, referred to herein as a respondent, receives an invitation to participate, so as to direct the client computer to connect to the URL of the web site associated with system 10, i.e., the servers 16 and 17. The URL being embedded in an e-mail invitation or an invitation contained as a web page hyperlink (such as being browsed by the user), or by media (print or electronic) providing the URL. The respondent accepts the survey at step 19 by clicking on the embedded URL in an e-mail or web page hyperlink, or otherwise inputs the URL of the system 10 into the browser of the respondent's client computer system 14, which then connects the respondent's browser (the browser) of the respondent's client computer system 14 (the respondent computer) to survey server 16 (step 20). The URL may have embedded identifiers which may identify the particular survey if the survey server 16 is offering more than one survey. Clicking on the URL instructs the browser to open window 22 on the respondent computer 14 (step 22) for an HTML page to be downloaded. An HTML page represents instructions in hypertext markup language, such as in JAVA script, which directs a browser to display a page with text, hyperlinks, images, and executable commands typical of JAVA script language. Images are downloaded by the browser making graphic calls (i.e., image file requests) to the connected server computer. Received image files are stored in the browser's cache 23 and are displayed in the browser window at a particular location during or after image download is complete, as typical of browser software. The browser's cache 23 represents a temporary storage location (e.g., memory or folder) on the respondent computer. Graphic calls can download image files, such as logos, buttons, images, or other graphical features.

The survey first has a screening section, in which the first of a series of HTML pages are sent to the browser 20 of the respondent computer (step 24) to be shown in browser's window 22 (step 26). The term "survey" may represent questions provided to the respondent which may have a series of answers adjacent to radio buttons or boxes, onto which the user may click using a mouse coupled to the respondent's computer system to indicate their answer. Any other types of answers formats could also be used, such as input fields for entry of alphanumeric characters, or pull down menu selection. The particular survey questions and their response sets on each HTML page are stored in memory of the survey server. The survey may be conducted over a network such as described, for example, in U.S. patent application Ser. No. 09/243,064, filed Feb. 2, 1999, now U.S. Pat. No. 6,311,190, which is herein incorporated by reference.

The screening section has one or more questions for screening respondents, such as to determine if the respondent is qualified to take the survey, e.g., is the respondent a person who would be a likely consumer of the target product of the survey, and demographic information, such as respondent's age, gender, race, marital status, income level, children, or the like, useful for grouping different respondents. At the bottom of each HTML page is a next button or other such button, that the respondent may click to indicate completion of the questions on that page. The answers are then returned and registered by the survey server 16, such as in a database in memory of the survey server that maintains a record of each of the respondent answers. The survey server in response to a clicked next button sends the next HTML page of the screening section to the browser window until all HTML pages have been sent to the browser and answers are received and registered.

Unknown to the respondent taking the screening section of the survey, each of the HTML pages has a sequential order of graphic calls. The graphic calls are prioritized in a particular sequence, forcing the browser to make the graphic call in a particular order, thereby forcing the order by which images (or image files) representing such graphics are downloaded by the graphic server 17 (step 28) and are stored in the browser's cache 23. For example, JAVA script for sequential download of images in HTML is available from irt.org at web site address http://developer.irt.org/script/282.htm. In each HTML page of the screening section, this priority is first based on all graphic calls needed for displaying the survey on that page, such as buttons or other graphical features which may be part of the survey, and then all of the HTML pages have a common series of additional graphic calls not needed for the survey. While the respondent is viewing and answering the questions on each HTML page, the browser is making these additional graphic calls in their specified order over network 13 from the graphics server 17. These additional graphic calls each request an image (e.g., a high resolution image of a plurality of elements, such as on one or more shelves, in an advertisement, or a product having multiple features) by a file name (or other identifier(s)) from the graphic server at step 28, which will be needed later to be displayed as part of the survey after the screening section is completed by the respondent. These additional images are referred to hereinafter as latent images as they are not detectable to the respondent on the pages of the survey. This is achieved by each of these latent images when downloaded by the browser from the graphics server being displayed in the browser window in a 1 by 1 pixel area (step 29). These 1 by 1 pixel are located in an unobtrusive part on the window, such as a period "." on screen which would otherwise be present in the text of the survey. However, this 1 by 1 pixel area may be at other location on the screen, such as part of an illustration or logo. Each downloaded latent image is located in a different 1 by 1 pixel area. Each HTML page of the screening section may have the same or different 1 by 1 pixel areas for each of the latent images when downloaded to the browser. Less preferably, larger pixel areas may be used so long as the image itself so rendered is not discernable to the respondent. The graphics server stores in memory multiple image files for images needed to be downloaded to a browser over the network 13.

When the HTML pages for the screening section are created by the survey server at step 24, at least two latent images are defined as primary images and one latent image is defined as a target (element) image, respectively, as will be described below. The target image represents the image of the target element being evaluated in the survey. Each primary image represents an image of multiple elements including the target element in a realistic setting. For example, in product package testing, the target element is of a target product package, and a primary image may be of one or more store shelves as may appear in a grocery store with the target product package. Different primary images are represented by different arrangements of the target element on such shelves with packages of different competing products. For example, in advertising testing, the target element is a feature of the advertisement (e.g., logo, graphics, text, or car color), and the primary images are of the advertisement with an arrangement of key elements (e.g., logos, graphics, words or sayings, models, color, etc.), and different primary images may have different arrangements of the key elements with the target feature. For example, in product feature testing, the target element may be a feature of the product (e.g., a gauge) in a configuration (or arrangements) of features for the product (e.g., dashboard display for a vehicle), and different primary images may have different configurations of features with the target feature.

Each of the latent images remains stored in the browser's cache (step 30) as the HTML pages are downloaded and the respondent clicks on the next button at the bottom each successive HTML page to indicating completion of the questions on that page to register the answers at the survey server (step 32).

For example, a series of four HTML pages each having a different set of survey questions, but each also having the same ordered series of ten graphic calls for download of latent images needed for later in the survey. When the respondent completes the first page of questions, it is possible that only two of the ten latent images have completely downloaded into their respective 1 by 1 pixel areas. The browser may download multiple images from the graphics server at a time. For example, Microsoft Internet Explorer downloads two images at a time, and Netscape downloads four images at a time. Since the next HTML page will have the same ten graphic calls for latent images, the browser will detect that the identifiers for first two images have already be downloaded into its cache and proceed to make a graphic call for the third and the fourth latent image in the order. The survey questions are divided onto a sufficient number of HTML pages, which will take a sufficient length of time to complete, such that by the time the respondent clicks to submit the last HTML page of the screening section, all of the latent images are downloaded from the graphics server, stored in browser cache 23, and displayed in different 1 by 1 pixel areas on the screen. In this manner, the latent images are preloaded in browser cache 23 by the time the respondent finishes the screening section of the survey, thereby making a display of latent images in the remaining parts of the survey independent of user bandwidth connection. Thus, the entire download of latent images appears transparent to the user as the user is engaged in responding to the initial survey questions. If necessary, additional questions may be included in the screening section solely for adding delay to the time needed by the respondent to answer the survey in order to complete the download of all latent images needed for display.

Figure 4:
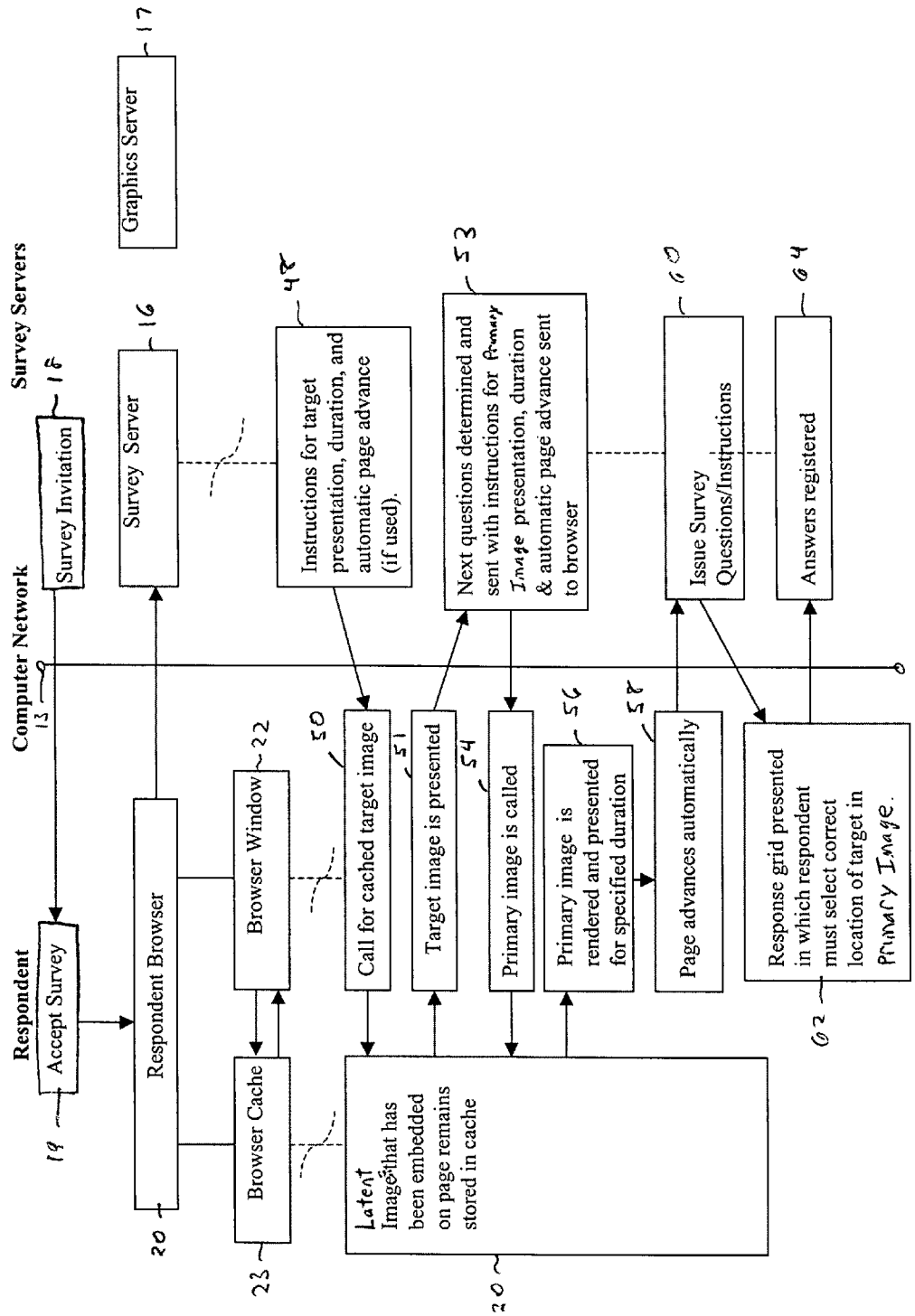
FIG. 4 is a flow diagram similar to FIGS. 2-3 chart of the operation of the system of FIG. 1 in which one of the preloaded primary images is timed displayed for target element findability testing.
Figure 4A:
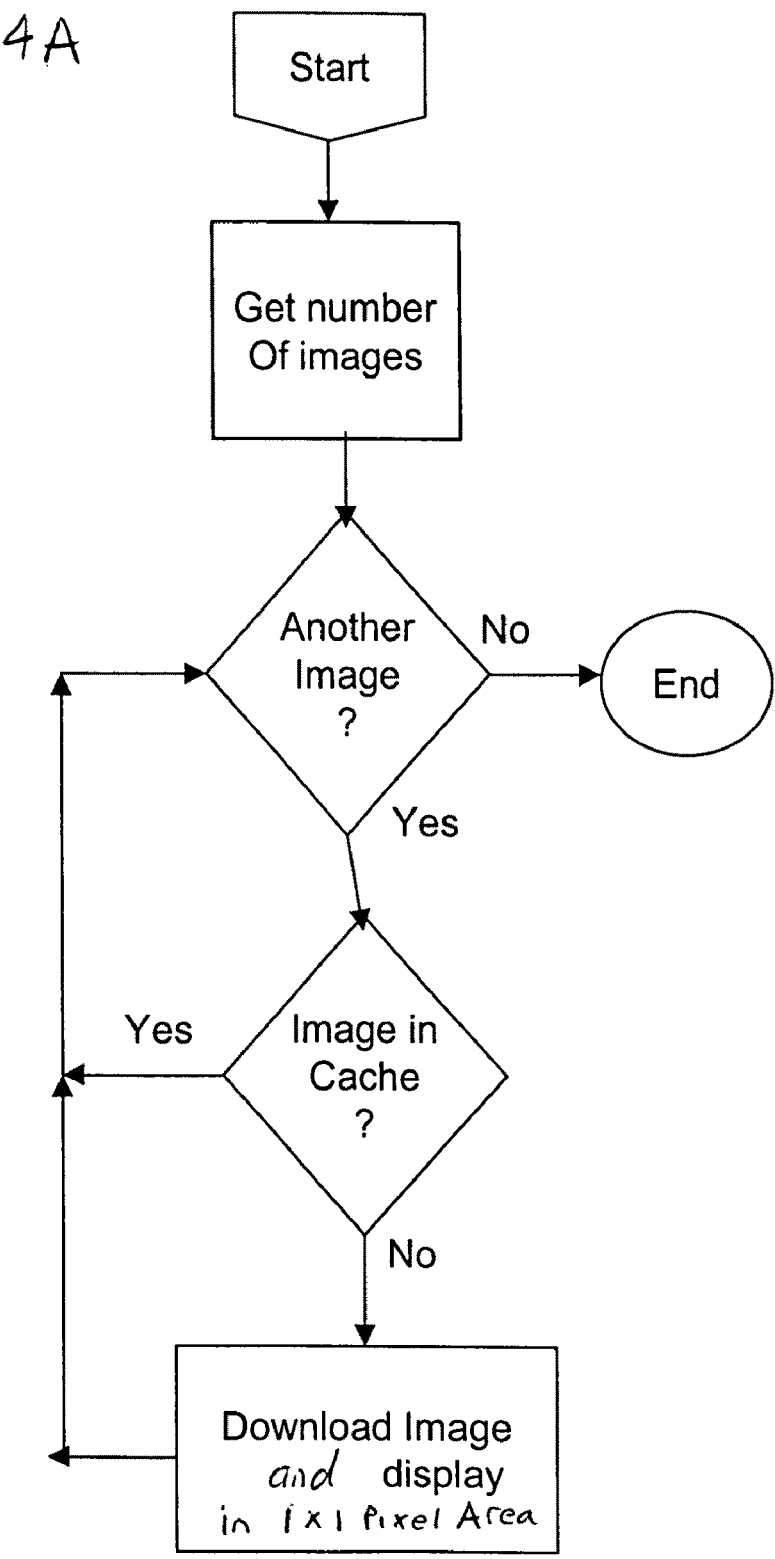
FIG. 4A is a flow chart showing the process for preloading images to the browser software of FIG. 2.

A flowchart of the process of downloading images in each the HTML pages of the screen section is shown in FIG. 4A. The browser in response to a graphic call instruction checks if the first image is stored in the browser's cache. This is an automatic feature of a typical browser to avoid redownloading an image. For example, the browser may check if the file name or other identifier of the image file is already present in the cache. If not present in the cache, the browser downloads that image from the graphics server and displays it in a 1×1 pixel area on the screen, otherwise, it checks if the second image is stored in its cache. This continues until all images are downloaded and displayed in its unobtrusive nondetectable locations on the screen. If the respondent advances the HTML page to the next HTML page in the screening section of the survey before the download of all latent images is completed, the process is restarted back by the browser again checking if the first image is stored in cache, as so forth.

The element recall section of the survey takes place once the respondent has returned answers to the survey question of pages of the screening section. The survey server sends to the browser a series of HTML pages including a first page with instruction text (and graphics if any) providing survey directions, a second page with a command to direct the browser to render a first one of the primary images (by the file name or an identifier for that image) at a specified location in the browser window for a set duration value (i.e., time interval) with automatic page advance. An example of the first page with instructions for product package testing is shown in FIG. 5 to inform the respondent that an image of some store shelves will be displayed, and to click on the next button on the screen (step 34). It may represent actual store shelves or an illustration of store shelves. Upon the user clicking the next button to advance the page, the primary image is called and upon finding it in browser cache (step 36) the browser renders (displays) the image onto the screen of browser window 22 at the specified location for the specified time interval (i.e., exposure period) (step 38), and the page automatically advances (step 40). Since the primary image is already downloaded to the respondent's computer, no delay is encountered due to limitations of network bandwidth or other network communication delays, such as at the survey server. The time interval for image display is of a pre-determined, finite duration, but will usually fall within the range of a quarter second to one and one-half seconds. The exposure duration is dependent on the empirical nature of the target element under evaluation. For example, a primary image for product package testing for soap packages is shown in FIG. 6, and soap packages being smaller packages on the shelves may need a longer exposure period (e.g., 1 sec.) for the respondent to answer the survey question(s) to be presented, while for example TV dinner packages being fewer in number on shelves, a shorter exposure period (e.g., ½ sec) may be used. Optionally, a lapse timer is also provided which records the start time when primary image is first rendered by the browser on the page and the end time when the page is blanked (or advanced). The difference between the start time and end time represents the actual lapse time, and is returned by the browser to the survey server after step 40, and compared against the specified time interval to assure that the presentation duration was proper. If the actual lapse time is shorter or longer within a tolerance setting, e.g., ±⅛ second, the element recall answers of the respondent may be discarded.

Figures 7, 8:
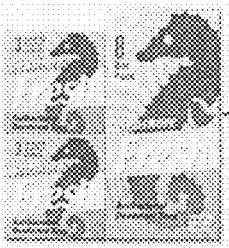
FIG. 7 is an example of a survey response set for timed display image of FIG. 6.
FIG. 8 is an example of a display screen in a browser window on the client computer system of FIG. 1 showing instructions for target element findability of FIG. 4, and an example of a target element image.

The automatic page advance directs the browser to request from the survey server the survey question page, and the survey server sends an HTML page with a survey question to determine recall of the elements of the image (step 42). Such recall may be unaided or aided. Unaided recall can be accomplished by presenting instructions to the respondent to try to remember as much as possible from the previously flashed primary image. The browser displays the question with either one or a series of text entry boxes in which the respondent can type in anything that can be remembered. Aided recall can be accomplished by presenting multiple elements in a grid and then having the respondent select one or more of the elements he or she recalls from the previously flashed primary image. In the following example, aided recall is used. The browser displays the aided-recall page containing the multiple elements at the respondent computer system (step 44). An example of the survey question and response grid for aided recall is shown in FIG. 7 for the product package example of FIG. 6. The images of the elements shown may be downloaded with the HTML page at step 42, or one or more of these images may be latent images stored in the browser cache earlier at step 30. Adjacent to each element is a radio button or box upon which is filled in upon being clicked upon by the respondent to indicate their selection. One of the possible answers on the grid may be that no elements (e.g., products or features) were seen. One or more other of elements on the response grid may represent elements which were not part of previously flashed primary image to determine the base line recognition of images selected, or to determine which respondents are not entering valid answers. When the respondent clicks the next button, the answers to the question are registered at the survey server (step 46).

Figure 4B:
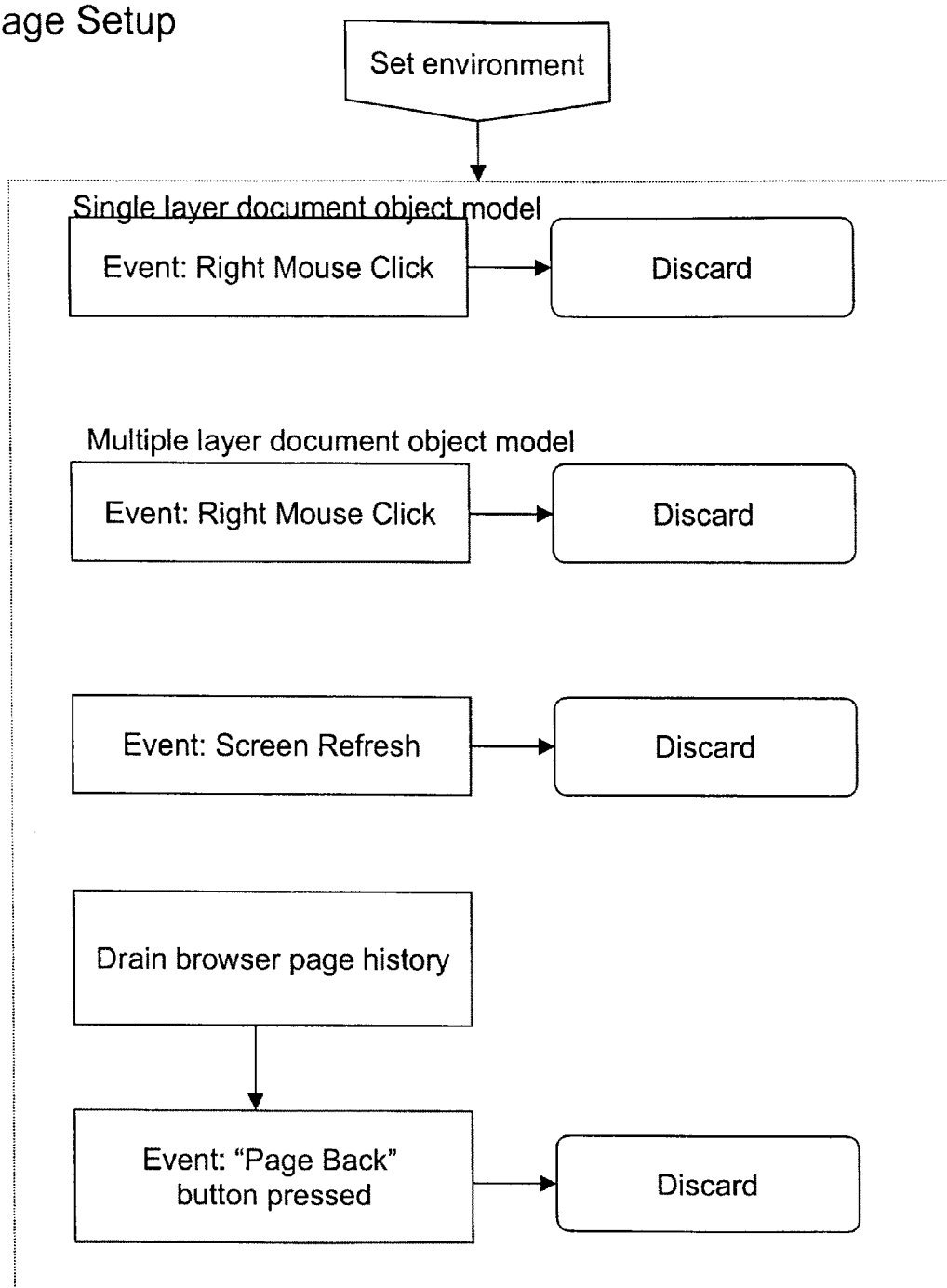
FIG. 4B is a block diagram of the timed display page setup of the environment of the client computer system in FIGS. 2 and 4.

An example of the page setup for the timed display of a primary image is shown in FIG. 4B. The environment is set such that events, such as right mouse clicks, screen refresh, page history review or page back buttons on the browser are discarded by the browser or otherwise disabled. This avoids interference which may stall the browser while the primary image is displayed. The environment is set by an HTML page which may be provided in JAVA script having code or program executable by the browser software to affect specific functionality of the user interface, keyboard or mouse, or other functions of the browser.

The process for displaying the primary image for a set interval of time in step 38 is shown in more detail in FIG. 4C in response to the HTML instructions received from the survey server at step 34. An interval of time in seconds or fractions thereof is specified in the instructions. The HTML page is displayed with the primary image outputted to the display from the browser's cache until the timer reaches the time value matching the interval of time specified and the page automatically expires and advances to the next page of the survey. The HTML page may be provided in JAVA script which has code or program executable by the browser operating at the respondent's computer with commands, such as to start and stop timers, execute a blank screen or page, direct the browser to display text (and/or graphics), or direct the browser to another address of another next HTML page of a server.

If desired, the element recall section of the survey may be repeated with a different timed display of the same or another primary image which may have a different arrangement of element, and survey question with product answer grid displayed having the same or fewer number of element selectable by the respondent by repeating steps 34 to 46.

After the element recall section of the survey is complete, the target findability section of survey may take place. The survey server sends to the browser an HTML page including a first page with instruction text (survey directions) and a graphic call to the target image (by the file name or an identifier for that image) at a specified location in the browser window (step 48). In response to receiving the HTML page, the browser renders the text (and graphics if any) of the instructions, calls for the target image stored in its cache earlier at step 30 (step 50), and upon finding it in its cache displays the target image at the specified location in the browser window (step 51). Optionally, the target image may be downloaded with a graphic call to the graphics server rather than by a preloaded latent image since it may need not be time displayed, or if desired, the target image will also be displayed for a specified duration with automatic page advance. The target image represents the element the respondent will be looking for in the primary image to be displayed. An example of the survey instructions and a target image 52 is shown in FIG. 8 for product package testing.

Figure 9:
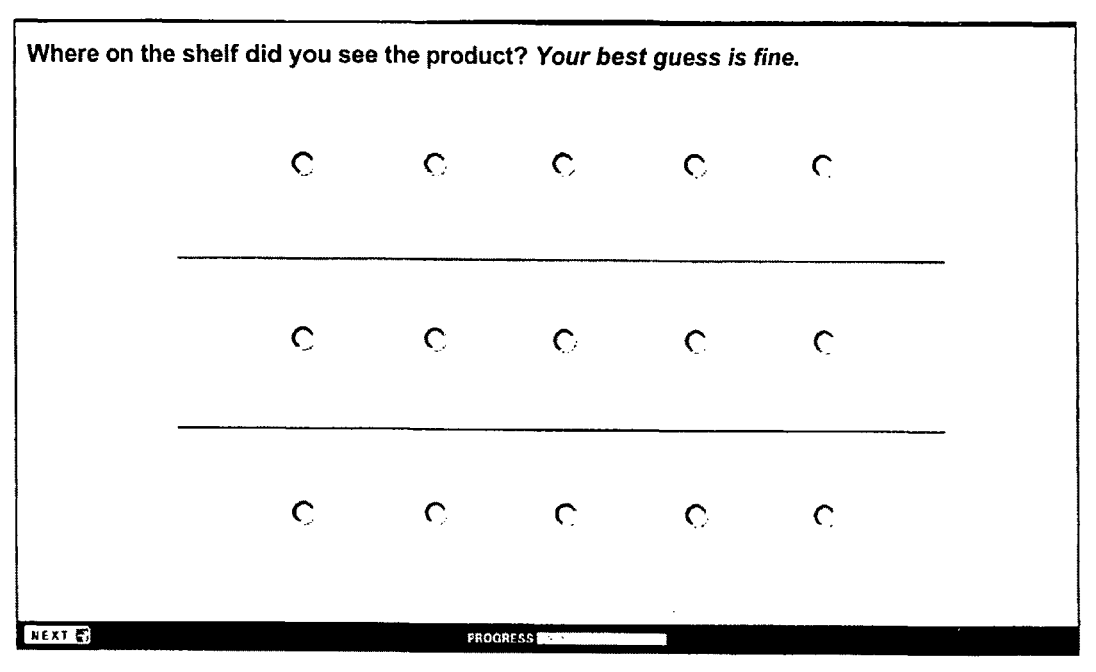

When the respondent clicks on the next button, a request is made by the browser to the survey server, the survey server then sends to the browser an HTML page with a command to direct the browser to render another one of the primary images (by the file name or an identifier for that image) at a specified location in the browser window for a set duration value (i.e., time interval) with automatic page advance (step 53). The browser in response to receiving the HTML page, calls the primary image and upon finding it in its cache (step 54) displays the primary image for the specified duration (step 56) and the page automatically advances (step 58), similar in the manner described earlier for steps 36, 38, and 40. The browser returns a message to the survey server that the presentation is complete, and the survey server sends an HTML page with survey question and instructions displaying a response grid of spatially separated radio buttons to enable the respondent to select, by clicking on one of the buttons, where the target element was seen in the previously flashed image (step 60). The browser then in accordance with the received HTML page displays the survey question and response grid (step 62). By clicking a button, the button is filled in, and the user may click on another button on the grid to change their selection. An example of this grid is shown in FIG. 9. The respondent when satisfied with their selection clicks on the next button, and the answer is registered at the survey server (step 64). The answers (i.e., responses) received to the questions during the screening, element recall, or target element findability section may be stored in memory (RAM or hard drive, or other typical storage unit) of the server computer 12. The server computer 12 may tabulate or tally the selected answers for the survey, or store specific answers for that survey in its memory.

The primary image used in target findability section preferably is different from the primary image used earlier in the element recall section of the survey. Although the target findability section and element recall section may be useful in combination in the survey, only one of such sections may be performed, or the order of the sections may be reversed than as described above. When only a single section is performed, at least one of said latent images is a primary image, rather than at least two being primary images as described earlier. Further, once the latent images are preloaded, any other marketing technique with one or more flashed primary images may be used with different instruction and response sets than described. The number of images downloaded into the browser's cache, as described earlier, depends on the number of primary images which will be flashed in the survey to respondents. Optionally, the graphics server may construct a composite of elements of the image with the target element in a primary image upon request of the survey server prior to that image being downloaded to the browser, rather than the primary image being stored in the memory of the graphics server.

Multiple designs of primary images may be offered to different respondents having different target element placements, so as to determine which target element placement results in highest recognition of the target element, such as product package, advertisement feature, or product feature. The selection of which of the multiple designs to be presented to a particular respondent may be random. Optionally, to balance the number of respondents of demographic groups, such as gender or age range, the particular design presented to a new respondent may be selected by a quota system, where each design ideally should be reviewed by an equal number of respondents in each demographic group. The survey server may track the number of respondents of each demographic group who have been surveyed for each of the multiple designs from answers to demographic questions taken during the screening section of the survey. If a new respondent falls into a demographic group which has not been adequately sampled by one of the designs, then that design is presented to that respondent. This quota system may be based on the number of a respondents needed in each demographic group for each design, or may be by balancing to obtain as close as to equal sampling percentage of respondents of each demographic group for each design. Accordingly, all primary images (or a subset thereof) may be preloaded into the browser's cache as described earlier at steps 26-30, and the primary image of the design is selected at step 34 or 53 by the survey server based on the answers of the respondent to one or more questions in the screening section of the survey.

In summary, a system and method has been described which enables evaluation of product packages, advertisements, or product features. In product package testing, the primary images each represent one or more shelves on a store or testing product impact on such shelves. In advertisement testing, where the primary images each represent advertisements with arrangements of key elements (e.g., logos, words or sayings, models, color, etc.) varied to different groups of respondents to measure the impact of such key elements and/or their findability in the advertising. In the element recall section of the survey, the respondent recalls any element of the advertisement they saw, they can provide information about the element's importance, i.e., what elements are noticed in the advertisement, and what elements were not, while target findability section of the survey, determines whether a particular element (or group of elements) can be located quickly. In product feature testing, the primary images each represent various configurations (or arrangements) of features for a product (e.g., design of a dashboard display for a vehicle). In the element recall section of the survey, the respondent recalls which features were seen to measure feature visibility or importance. In the findability section of the survey, the respondent is requested to located a feature (e.g., a warning light) in the primary image. This can be an indication of the effectiveness of different feature configurations of the design.

From the foregoing description, it will be apparent that an improved system and method for measuring reactions to product packaging, advertising, or product features over a computer-based network has been provided. Variations and modifications of the herein described system and method, and other applications for the invention will undoubtedly suggest themselves to those skilled in the art. Accordingly, the foregoing description should be taken as illustrative and not in a limiting sense.

The invention claimed is:

1. A system for measuring reactions to packaging, advertising, and product configuration at computer systems over a network, said system comprising:
    at least one first computer system connected to said network;
    at least one second computer system capable of connecting to said first computer system through said network in which said first computer system has a browser for viewing pages from said second computer system;
    said second computer system sending to said first computer system a set of questions to be displayed by the browser on one or more pages having one or more images downloaded from said second computer system for storage by the browser in memory of said first computer system which are displayed into pixel areas on display of the first computer system which avoids user detection or avoid user discernment of the downloaded images, and said second computer system receives answers from said questions from said first computer system; and
    said second computer system instructs the browser of said first computer system to display for user viewing at least one of said downloaded images from the memory of the first computer system for a pre-determined short interval of time, and to display at least one question regarding said image displayed for said pre-determined short interval of time, and said second computer system receives the answer from said question from said first computer system, wherein a plurality of said images are downloaded from said first computer to said second computer, and a common set of said plurality of images are downloaded in each of a plurality of successive ones of said pages in said pixel areas.

2. The system according to claim 1 wherein said image displayed for said short interval of time has a plurality of elements and said question regarding said displayed image enables selection of one or more of said elements recalled from the displayed image.

3. The system according to claim 1 wherein said image displayed for said short interval of time has a plurality of elements and said question regarding said displayed image enables selection of the location of a target element in the displayed image.

4. The system according to claim 1 wherein said image displayed for said short interval of time represents product packages, an advertisement, or a product.

5. The system according to claim 1 wherein said pixel area is a 1 by 1 pixel area.

6. The system according to claim 1 wherein said pixel area is a 1 by 1 pixel area displayed as part of text providing said set of questions.

7. The system according to claim 1 wherein said second computer system represents a plurality of second computer systems in which one of said plurality of second computer systems provides said one or more pages to said first computer system, and another of said plurality of second computer systems provides said one or more images for download to said first computer system in response to requests in said one or more pages.

8. A method for measuring reactions to evaluate the effectiveness of a target element in one or more primary images of a plurality of elements including the target element by a respondent over a network, comprising the steps of:
    connecting a client computer system of a respondent over a network to at least one server computer system;
    sending from the server computer system to a client computer system survey questions;
    displaying on a display coupled to the client computer system said survey questions on one or more pages on the display;
    answering the questions at the client computer system displayed on each of said pages on the display;
    returning from the client computer system to the server computer system answers to the survey questions from each page;
    downloading a plurality of images to the client computer system from the server computer system for storage in memory of the client computer system while said displaying and answering steps are being carried out, in which a common set of said plurality of said images are displayed in each of a plurality of successive ones of the pages at said displaying step at pixel areas which avoids user detection or avoids user discernment of the images;
    sending from the server computer system to the respondent computer system instructions directing the client computer system to display survey directions and one of the images for a specified interval of time, and at least one question having selectable responses;
    displaying at the respondent computer system in accordance with said instructions said survey directions and one of said images stored at said downloading step from memory of the client computer system for said specified interval of time, and
    at least one question regarding the displayed image with at least one of said responses being selected by said respondent; and returning from the client computer system to the server computer system said one or more of said selected responses to said question regarding the displayed image.

9. The method according to claim 8 wherein said image displayed for said interval of time has a plurality of elements and said responses enables selection of one or more of said elements recalled from the displayed image.

10. The method according to claim 8 wherein said image displayed for said interval of time has a plurality of elements and said responses enables selection of a location of a target element in the displayed image.

11. The method according to claim 8 wherein said image displayed for said interval of time represents product packages, an advertisement, or a product.

12. The method according to claim 8 wherein each of said pixel areas is a 1 by 1 pixel area.

13. The method according to claim 8 wherein each of said pixel areas is a 1 by 1 pixel area displayed as part of text providing said survey questions.

14. The method according to claim 8 wherein said interval of time is at or less than one second.

15. The method according to claim 8 wherein said one of the images represents a first image, and said method further comprises the steps of:
sending from the server computer system to the respondent computer system instructions directing the client computer system to display a second one of said images with other survey directions, and said client computer system displays said other survey directions said second one of said images stored at said downloading step in memory of the client computer system; and
displaying at the respondent computer system in accordance with said instructions said other survey directions and said second one of said images stored at said downloading step from memory prior to displaying said first image for said specified interval of time.

16. The method according to claim 8 further comprising the step of selecting said one of said images to be displayed for said specified interval of time by said server computer system based upon one or more of said returned answers to said survey questions prior to carrying out said step of sending instructions.

17. The method according to claim 8 further comprising the step of repeating said step of sending instructions, said step of displaying in accordance with said instructions, and said step of returning one or more selected responses with different ones of said images downloaded into memory, survey directions, and question regarding the displayed image.

18. A system having one or more computer systems providing a web site for downloading images to a browser operating on a client computer system having a display and a cache for temporary storage of files, said client computer system being capable of communicating via a network to the web site, comprising:
at least one server computer system at the web site storing images in which said server computer system is capable of communicating with said client computer system over said network; and
means for sending instructions defining a plurality of pages from said server computer system to said client computer system in which each of said plurality of pages requests from said server computer system a common series of image files, and in response to said requests said image files are sequentially downloaded from said server computer system via said network into said cache of the client computer system and displayed on said pages by the browser each in a small pixel area on the display so that said images are not detectable or not discernable by a user of said client computer system.

19. The system according to claim 18 further comprising: means for sending instructions to said client computer system to display from said cache an image from one of said image files.

20. The system according to claim 19 wherein said image from said cache is displayed for a pre-determined interval of time.

21. The system according to claim 19 wherein said image from said cache is displayed for a short interval of time.

22. The system according to claim 18 wherein said images downloaded represent one of a product packages, an advertisement, or a product.

23. The system according to claim 18 wherein advancement through said plurality of pages by the user provides sufficient length of time for all of said image files to be downloaded to said client computer system.

24. A system for downloading latent images having two or more computer systems coupled over a network comprising:
a first computer system which stores a plurality of images; and
a second computer system which receives successive pages from said first computer system in which each of said successive pages are capable of having a common series of image requests to enable download of images from said first computer system which are displayable in said pages in pixel areas on a display of said second computer system that avoids user detection or avoid user discernment of each of the downloaded images, wherein at least one of said images downloaded is displayed for a pre-determined interval of time at said second computer system.

25. The system according to claim 24 wherein said pages are part of a survey.

26. The system according to claim 24 wherein advancement through said successive pages by the user provides sufficient length of time for all of said image files to be downloaded to said second computer system.

27. A system having one or more computer systems providing a web site for downloading images to a browser operating on a client computer system having a display and a cache for temporary storage of files, said client computer system capable of communicating via a network to the web site, comprising:
at least one computer server storing one or more images in which said computer server is capable of communicating to the client computer system over a network, in which said computer server sends instructions defining one or more pages from said computer server to said client computer system, and each of said one or more pages requests from said computer server a common series of one or more image files, and in response to said requests said image files are sequentially downloaded from said computer server via said network into said cache of the client computer system and displayed on said one or more pages by the browser of said client computer system each in a pixel area on the display so that said images are not detectable or not discernable by a user of said client computer system, wherein said computer server sends instructions to said client computer system to display from said cache of said client computer system at least one of said downloaded image files for a pre-determined interval of time.

28. A system for downloading images over a network comprising:

one or more computer servers which store one or more images, said one or more computer servers being capable of sending in successive pages to at least one other computer system over a network, in which each of said successive pages are capable of having the same requests for said one or more images to enable download of said one or more images from said one or more computer servers to the other computer system which are displayable in said pages in pixel areas on a display of said other computer system that avoids user detection or avoid user discernment of said one or more of the downloaded images, and then sending instructions to the other computer system to display at least one of said downloaded images in a marketing survey of one or more pages having one or more questions related to one or more elements in the displayed image, and to return one or more answers to said one or more questions for storage at said one or more computer servers.

* * * * *